Patented July 26, 1927.

1,636,946

UNITED STATES PATENT OFFICE.

FRIEDRICH W. WEBER, OF HACKENSACK, NEW JERSEY.

PURIFICATION OF OILS.

No Drawing.  Application filed March 18, 1926. Serial No. 95,800.

This invention relates to the purification of crude oils and their distillation products, including the products obtained by the so-called cracking processes.

The refining of oils, such as gasoline and kerosene, has until recently been considered a simple process, but it is becoming more complicated owing to the higher requirements of the market and because of the constantly increasing production of cracked oils.

The method of refining an oil for the removal of such impurities as asphaltic or bituminous substances, thio-alcohols, pyridines etc. varies of course very much with the provenience of the oil, with the nature of its impurities and with the use to which the finished product is to be put.

The main object of my invention is to provide a process which is easily and quickly operated, does require only low priced chemicals and can be operated with the apparatus already established in this particular industry. Moreover, the process does not entail any manipulation which would give rise to any danger during its operation.

For the better understanding of my invention I am going to describe the series of steps which I have found most serviceable for the majority of oils, said process being set forth as an example only of my process which will be subject to variations according to changes in the composition of the oil.

In performing the purification of the oil I first separate by mechanical filtration as far as possible all foreign matter, suspended in the oil, and to the filtrate I add first some water, vigorously agitating both materials until a homogenous emulsion is formed, and then I add a hypo-halite, for instance such as the hypo-halite of an alkali or alkali earth metal, for instance calcium hypochloride, preferably in the form of a fine powder; thus I obtain a good mixture of the oil with the hypo-halite. I find that the effect of the hypochlorous acid is very much greater if the hypochlorite has been added after the oil and water had already formed an emulsion.

This operation is mostly going on at the atmospheric temperature, though, if necessary, I slightly heat the mixture to accelerate the oxidation of the various substances. After the agitation has gone on for about 15 minutes, and tests have shown that hypohalite powder has acted properly I stop the agitator, allow to settle and remove the sludge, which has accumulated at the bottom of the agitating vessel, in any of the well known ways. Thereupon I introduce another portion of water to the oil, agitate again both materials to dissolve all soluble substances formed by the treatment of the oil with hypo-halite powder and after the agitation has continued for 30 minutes, the slight emulsion formed thereby is allowed to settle and washing water is then drawn off. The washing may be repeated if necessary.

Next I introduce into the oil a solution of an agent soluble in water and capable of generating active oxygen, such as a solution of hydrogen peroxide, or of an alkali metal peroxide, such as sodium peroxide, of a per-salt, such as sodium perborate etc.; this is done at an elevated temperature for the purpose of oxidizing any organic compound generated by the treatment of the oil with the hypo-halite, and of thereby bringing such compounds into water soluble form. After this oxidation has come to end, the reaction mixture is again allowed to settle, the aqueous solution, containing the basic substance or salt created by the development of the active oxygen, collecting at the bottom of the reaction vessel from where it is then discharged in the usual manner.

Thereupon I treat the oil, freed of moisture as described, with sulfuric acid, for instance such as 66° Bé., care being taken at the introduction of the relatively small quantity that the oil is vigorously agitated so as to avoid any local overheating. While the agitation with the sulfuric acid is going on, the mixture of the oil and of the sulfuric acid is kept at approximately the atmospheric temperature, or only slightly above the same. The action of the sulfuric acid on the oil is usually completed in ½ hour, provided the mixture has been well agitated all the time, either by air or by mechanical means, and thereupon the mixture is allowed to settle, practically over night a heavy sludge accumulating at the bottom, which sludge is drawn off in the usual manner. However, a small fraction of acid is left intentionally in the oil and is not removed therefrom by washing with water, as it is resorted to in the further purification of the oil. I add then to the oil, showing on account of the acid retained by it a pronounced acid reaction, a practically saturated solution of a salt formed by a water soluble base, for instance an alkali metal hydrate, with a metal oxide of acid character. Salts coming in consideration are for instance sodium silicate, sodium aluminate, sodium titanate, sodium zirconate, sodium zincate, sodium stannate, sodium antimoniate, sodium tungstate, and similar salts, which are capable of undergoing decomposition when coming in contact with acid, generating thereby the corresponding salt of that acid with the base of the applied metal-hydroxide which precipitates in a voluminous flocculent form.

When the practically saturated solution of such a salt, for instance sodium silicate solution, is added, I agitate the oil vigorously so as to spread this solution in the form of the most minute drops in the acid oil mixture. An element of importance is that I add a considerable excess of this salt solution to the oil of slightly acid reaction, very much more than is needed for the neutralization of the acid. The flocculent precipitate of silicon hydroxide, formed immediately when the soluble silicate comes in contact with the acid, is very light and therefore remains suspended in the oil for a longer time than can be afforded in commerical operation so it is at present removed by rather cumbersome operations, such as filtering the oil etc. By my new method of operating, consisting in decomposing the sodium silicate solution in the highly agitated acid-oil mixture, I cause the fine, but heavy drops of the surplus solution to engage the fine light flocules of silicon hydroxide and to tenaciously adhere to the same, thereby pulling these floccules immediately down to the bottom of the vessel as soon as the agitation is stopped and the oil comes to rest; this phenomenon yields in the course of some few minutes a clear neutral and odorless oil which is drawn off, the sediment accumulated at the bottom of the vessel containing besides the silicon-hydroxide all the coloring matter dissolved in the oil.

With oils of very refractory character I bring about the generation of the silicon-hydroxide in a somewhat different manner. When such refractory oils have been treated up to the point that the acid sludge has been removed and a part of the acid has been left in the oil, then I add first a certain quantity of a colloidal ferric chloride liquor to the oil, said liquor having been made for instance by dissolving 1 lb. of cryst. techn. ferric chloride in 1 lb. of water and diluting the solution thus obtained to 1 liter; to 200 cc. of this solution I add then 25 grammes of a mixture of the carbonates of all the rare earth metals usually found in Monazite sand, or of those left in the residue of such Monazite sand after the rare earth metals used for incandescent gas light mantles, have been separated, and with a copious discharge of gases a dark-red transparent and clear solution is obtained; this solution, containing the chlorides of the rare earth metals, dissolves in water in every proportion, but coagulates immediately and yields a heavy precipitate of ferric hydroxide upon the addition of sulfuric acid, or of a sulfate either in solid form or in solution. This precipitate of ferric-hydroxide is extremely voluminous and displays a great power of absorption which exerts itself very favorably in the desulfurization of the oil.

Of this ferric chloride solution, made as described above, I add to the acid-oil mixture in the proportion of 15 cc. to each liter of oil, and the precipitate of ferric-hydroxide is formed immediately on account of the presence of sulfuric acid in the oil; however, as the precipitation of the ferric hydroxide liberates a certain amount of acid, I can add also in this operation a considerable surplus of sodium silicate, thereby neutralizing the acid in the oil and causing a heavy precipitate of silicon hydroxide. Simultaneously with the latter the rare earth metals are precipitated in the form of their hydroxides and both the silicon-hydroxides and the rare earth metal hydroxides combine with the ferric hydroxide, or basic ferric chloride if the reaction has not been fully completed, and exert an excellent effect in the purification of the oil on account of their enormous capability of occluding all discoloring and odorous matters. After the oil has been separated from the precipitate of the hydroxides it can be distilled by any of the well known ways in the presence of sodium carbonate. The distillation can be made with direct heat or with steam, and the obtained distillate is in either case free of any coloring matter and displays a pleasant smell which does not change even if the distillate is exposed to sunlight for a great length of time. The obtained oil is also free of chlorine and of sulfur and if occasionally some trace of the latter can be noticed, it is of such small amount as to comply with the highest requirements of the market.

What I claim is:

1. The method of purifying crude petroleum and the various distillates obtained therefrom, said method consisting in filtering off the impurities carried by the oil adding water to the oil filtrate, agitating the mixture of oil and water, adding to the said agitated mixture of oil and water a hypohalite of an alkali metal, separating the sludge formed by the action of the said hypohalite, washing the oil with water, adding another portion of water to the oil, agitating this latter mixture of oil and water introducing into this agitated mixture of oil and water an agent soluble in water and capable of generating active oxygen, settling the reaction mixture and separating the aqueous layer forming at the bottom, washing the oil, agitating the oil, adding sulfuric acid to the agitated oil, thereby forming a heavy sludge, settling the acid oil mixture and separating the said sludge from the acid oil mixture, agitating the acid oil mixture, adding to the agitated acid oil mixture an excess of a practically saturated solution of a salt, formed by an alkali metal base and a metal oxide of acid character, thereby immediately precipitating the metal oxide in the form of its hydroxide, causing the mixture of aforesaid metal hydroxide and the excess of aforesaid solution to settle out from the oil, separating the aforesaid mixture of metal hydroxide and the excess of the solution from the oil, and distilling the same in any of the well known ways.

2. The method of purifying crude petroleum and the various distillation products obtained therefrom, said method consisting in filtering off the impurities carried by the oil adding water to the oil filtrate, agitating the mixture of oil and water, adding to the said agitated mixture of oil and water a hypohalite of an alkali metal, separating the sludge formed by the action of said hypohalite, washing the oil with water, adding another portion of water to the oil, agitating this latter mixture of oil and water introducing into this agitated mixture of oil and water an agent soluble in water and capable of generating active oxygen, settling the reaction mixture and separating the aqueous layer forming at the bottom, agitating the oil adding sulfuric acid to the agitated oil, thereby forming a heavy sludge, settling the acid oil mixture and separating said sludge from the acid oil mixture, agitating the acid oil mixture adding to the agitated acid oil mixture a colloidal ferric chloride liquor, containing basic ferric chloride and the basic chlorides of rare earth metals, thereby precipitating ferric hydroxide, adding an excess of a practically saturated solution of a salt, formed by an alkali metal base and a metal oxide of acid character, thereby immediately precipitating the metal oxide contained in the salt and the rare earth metals in the form of their hydroxides, causing the combined metal hydroxides and the excess of the aforesaid salt solution to settle out from the oil, separating the aforesaid mixture of metal hydroxides and the excess of the solution from the oil, and distilling the same in any of the well known ways.

3. The method of purifying crude petroleum and the various distillates obtained therefrom, said method consisting in filtering off the impurities carried by the oil adding water to the oil filtrate, agitating the mixture of oil and water, adding to the said agitated mixture of oil and water calcium hypochlorite, separating the sludge formed by the action of said calcium hypochlorite, washing the oil with water, adding another portion of water to the oil, agitating this latter mixture of oil and water introducing into this agitated mixture of oil and water a solution of sodium peroxide, settling the reaction mixture and separating the aqueous layer forming at the bottom, agitating the oil adding sulfuric acid to the agitated oil, thereby forming a heavy sludge, settling the acid oil mixture and separating said sludge from the acid oil mixture, agitating the acid oil mixture adding to the agitated oil mixture an excess of a practically saturated aqueous solution of sodium silicate thereby immediately causing a voluminous heavy precipitate of silicon hydroxide, causing the mixture of aforesaid silicon hydroxide and the excess of aforesaid sodium silicate solution to settle out from the oil, separating the aforesaid mixture from the oil, and distilling the same in any of the well known ways.

4. The method of purifying crude petroleum and the various distillates obtained therefrom, said method consisting in filtering off the impurities carried by the oil adding water to the oil filtrate, agitating the mixture of oil and water, adding calcium hypochlorite to the said agitated mixture of oil and water, separating the sludge formed by the action of said calcium hypochlorite, washing the oil with water, adding another portion of water to the oil, agitating this latter mixture of oil and water introducing into this agitated mixture of oil and water a solution of sodium peroxide, settling the reaction mixture and separating the aqueous layer forming at the bottom, washing the oil, agitating the oil adding sulfuric acid to the agitated oil thereby forming a heavy sludge, settling the acid oil mixture and separating the sludge from the acid oil mixture, agitating the acid oil mixture adding to the agitated acid oil mixture a colloidal ferric chloride liquor containing basic ferric chloride and the basic chlorides of rare earth metals thereby precipitating ferric hydroxide, adding an excess of a practically saturated solution of sodium silicate to the reaction mixture, thereby immediately causing a voluminous heavy precipitate of silicon hydroxide and of the hydroxides of the rare earth metals, causing the combined metal hydroxides and the excess of the aforesaid sodium silicate solution to settle out from the oil, separating the aforesaid mixture of metal hydroxides and the excess of the solution of sodium silicate from the oil, and distilling the same in any of the well known ways.

5. The method of purifying crude petroleum and the various distillates obtained therefrom by means of sulfuric acid, said method comprising agitating the oil, adding sulfuric acid to said oil forming a sludge thereby, separating the sludge from the acid-oil mixture, agitating the acid oil mixture, adding to the agitated acid oil mixture a colloidal ferric chloride liquor, containing basic ferric chloride and the basic chlorides of rare earth metals, thereby precipitating ferric hydroxide, adding an excess of a practically saturated solution of sodium silicate to the reaction mixture, thereby immediately causing a voluminous heavy precipitate of silicon hydroxide and of the hydroxides of the rare earth metals, causing the combined metal hydroxides and the excess of the aforesaid sodium silicate solution to settle out from the oil, separating the aforesaid mixture of metal hydroxides and the excess of the sodium silicate solution from the oil, and distilling the same in any of the well known ways.

In testimony whereof I affix my signature.

FRIEDRICH W. WEBER.